G. W. Prince,
Tin Can.
Nº 43,371. Patented June 28, 1864.
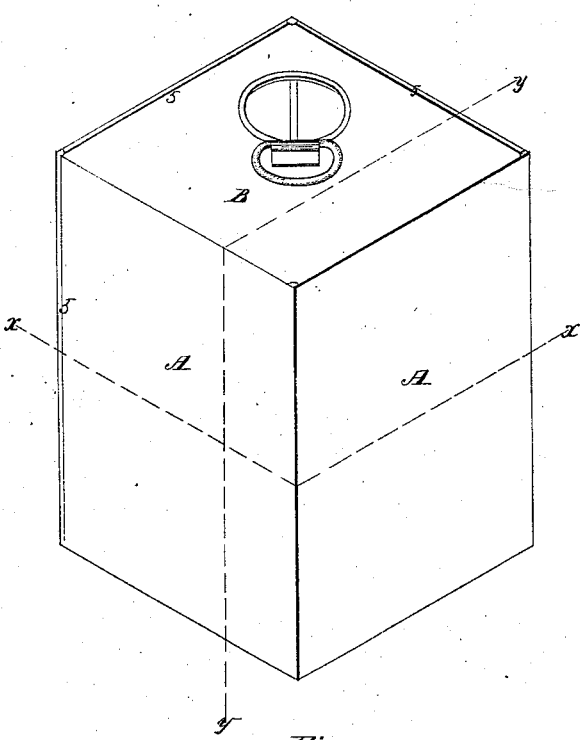
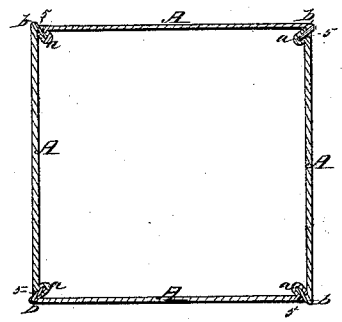
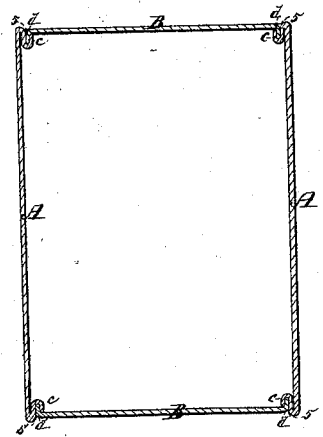
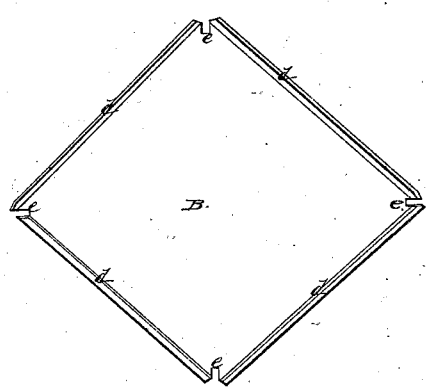

UNITED STATES PATENT OFFICE.

GEORGE W. PRINCE, OF CAMBRIDGE, ASSIGNOR TO BANKER & CARPENTER, OF BOSTON, MASSACHUSETTS.

IMPROVEMENT IN THE MANUFACTURE OF TIN CANS.

Specification forming part of Letters Patent No. 43,371, dated June 28, 1864.

*To all whom it may concern:*

Be it known that I, GEORGE W. PRINCE, of Cambridge, in the county of Middlesex and State of Massachusetts, have invented certain Improvements in the Manufacture of Tin Cans, of which the following is a full, clear, and exact description, reference being had to the accompanying drawings, making part of this specification, in which—

Figure 1 is a perspective view of my improved can; Fig. 2, a transverse section through the same on the line $x\,x$ of Fig. 1; Fig. 3, a vertical section through the same on the line $y\,y$ of Fig. 1; Fig. 4, a view of one of the end plates.

In flat-sided tin cans, more particularly those used for containing oils, paints, &c., a great difficulty has been experienced on account of their liability to leak at the joints, especially if roughly handled, which often occasioned considerable loss.

My invention has for its object to remedy this inconvenience; and it consists in uniting the top, bottom, and sides of such a can by means of single flanges, and double or guttered flanges, so combined together as to form a can of great strength and durability, which is not liable to leak when subjected to rough usage, and possesses a neat and finished appearance.

To enable others skilled in the art to understand and use my invention, I will proceed to describe the manner in which I have carried it out.

In the said drawings, A represents the side pieces, and B the end pieces, of a tin can constructed after my improved method. One of the vertical edges of each piece A is turned over so as to form a double flange with a groove or gutter, $a$, Fig. 2, while the opposite edge is simply turned over, forming a single flange, $b$. The upper and lower edges of the pieces A are also turned over so as to form grooves $c$ similar to the grooves $a$. The top and bottom pieces, B, (one of which is shown in Fig. 4,) have their edges turned over, forming a single flange, $d$, and at each corner is cut a square notch, $e$, to accommodate the projection or rib formed by the flanges of the side pieces, A, when put together. When the side pieces, A, are put together the flanges $b$ fit into the grooves $a$, after which the top and bottom pieces, B, are inserted in place, the flanges $d$ entering the groove $c$, each seam or joint leaving a small groove, 5, on the exterior surface of the can, into which solder is run with an ordinary soldering-iron, which fills the groove 5 with solder, thus making a tight and solid joint, which is not liable to leakage, and the projection or rib on the interior of the seam also adds materially to the strength of the can.

By the use of my improvements a can may be put together and soldered in much less time than by the ordinary method, and the saving in solder and labor is sufficient to compensate for the additional cost of making the flanges on the plates, and a can so made will possess greater strength and durability, a neater appearance, and will bear a greater amount of rough usage without being impaired than any can with which I am acquainted.

A side plate, A, instead of being made with a groove in one edge and a single flange in the other, may be made with a groove in each edge, and each adjoining plate have its contiguous edge furnished with a single flange.

It is evident that my improvements are equally applicable to a flat-sided can of a different cross-section having three or more sides.

What I claim as my invention, and desire to secure by Letters Patent, is—

Uniting the top, bottom, and sides of a tin can by means of double or guttered flanges on one piece and single flanges on the adjacent pieces through the intervention of solder applied thereto, when the lock or joint is turned and formed on the inside of the can, which gives strength to the can and protection to the lock or joint, substantially in the manner and for the purpose described.

GEO. W. PRINCE.

Witnesses:
P. E. TESCHEMACHER,
N. W. STEARNS.